United States Patent [19]

Germer

[11] Patent Number: 4,582,675
[45] Date of Patent: Apr. 15, 1986

[54] MAGNETIC SWITCH FOR REACTOR CONTROL ROD

[75] Inventor: John H. Germer, San Jose, Calif.

[73] Assignee: The United States of America as represented by the United States Department of Energy, Washington, D.C.

[21] Appl. No.: 429,922

[22] Filed: Sep. 30, 1982

[51] Int. Cl.$^4$ .............................................. G21C 7/08
[52] U.S. Cl. ..................... 376/336; 376/233; 335/208; 335/146
[58] Field of Search ............... 376/336, 337, 233, 228, 376/219; 335/208, 146

[56] References Cited

U.S. PATENT DOCUMENTS

| | | | |
|---|---|---|---|
| 2,931,763 | 4/1960 | Dever | 204/193.2 |
| 3,139,384 | 6/1964 | Filloleau et al. | 376/228 X |
| 3,295,081 | 12/1966 | Bowyer et al. | 335/208 |
| 3,464,225 | 9/1969 | Watrous et al. | 335/208 X |
| 3,538,467 | 11/1970 | Middendorf | 335/146 |
| 3,812,441 | 5/1974 | Sakamoto et al. | 335/208 |
| 3,940,309 | 2/1976 | Imperiali | 376/228 X |
| 3,976,540 | 8/1976 | Sowa | 376/336 X |
| 4,023,128 | 5/1977 | Itou et al. | 335/208 |
| 4,121,184 | 10/1978 | Dinkler et al. | 335/208 X |
| 4,304,632 | 12/1981 | Bhate | 376/336 |

FOREIGN PATENT DOCUMENTS 0516116 6/1976 U.S.S.R. .............................. 335/208

Primary Examiner—Deborah L. Kyle
Assistant Examiner—Dan Wasil
Attorney, Agent, or Firm—L. E. Carnahan; Roger S. Gaither; Judson R. Hightower

[57] ABSTRACT

A magnetic reed switch assembly for activating an electromagnetic grapple utilized to hold a control rod in position above a reactor core. In normal operation the magnetic field of a permanent magnet is short-circuited by a magnetic shunt, diverting the magnetic field away from the reed switch. The magnetic shunt is made of a material having a Curie-point at the desired release temperature. Above that temperature the material loses its ferromagnetic properties, and the magnetic path is diverted to the reed switch which closes and short-circuits the control circuit for the control rod electromagnetic grapple which allows the control rod to drop into the reactor core for controlling the reactivity of the core.

16 Claims, 5 Drawing Figures

MAGNETIC SWITCH FOR REACTOR CONTROL ROD

BACKGROUND OF THE INVENTION

The invention described herein arose in the course of, or under, Contract No. DE-AT03-76SF71032 between the U.S. Department of Energy and the General Electric Company.

This invention relates to self-actuating shutdown systems for nuclear reactors, particularly to such shutdown systems which utilize an electromagnetic grapple to hold and release the control rods above the reactor core, and more particularly to a temperature responsive magnetic reed switch for activating the electromagnetic grapple and releasing the control rods.

The use of control systems to regulate the reactivity of a nuclear reactor by varying the location of control (neutron absorber) elements or rods with respect to the reactive core is well known. With a view toward the possibility of an emergency condition arising, as by an unexpected drop in coolant flow, increase in temperature, or rise in reactivity, such control systems include arrangements for "scramming" the control rods, i.e., for rapid insert of the absorber elements into the core to quickly shut down the reactor.

With the advent of the liquid metal fast breeder reactor (LMFBR), a need for faster, less complex, more reliable control rod scram or shutdown systems has become apparent, whereby the reactivity of the reactor can be quickly shut down.

More recent efforts have been directed to the desirability of utilizing secondary or alternate control systems of the self-actuating type which would make an LMFBR inherently safe. Such alternate or self-actuating systems provide control without reliance on the primary reactor control system or plant operators, while being capable of actuation by the plant operators. These efforts have resulted in systems which sense the reactor flow rate and actuate when the flow drops below a predetermined level, measure the temperature of the coolant and actuate when the temperature exceeds a specified point, or measure the flux or reactivity level of the reactor and actuate when the reactivity exceeds a specified level.

Various different types of control rod activation systems have been developed, one of which utilizes an electromagnetically actuated grapple. In this type of activation system, the control rods are held out of the active reactor core region by a grapple arrangement controlled by an electromagnetic arrangement, whereupon sensing of a low coolant flow or a high coolant temperature condition, for example, the electromagnetic arrangement is activated, such as by short circuit, to drop the control rod into the reactor core.

The following exemplifies prior known electromagnetically actuated control rod systems:

U.S. Pat. No. 2,931,763 issued Apr. 6, 1960, to J. A. Dever discloses a control apparatus incorporating electromagnetically held control rods. The control rods are released upon a signal initiated within an ionization chamber. Electron tubes conduct sufficient current to retain the control rods as long as the neutron flux remains below a predetermined level.

U.S. Pat. No. 3,940,309 issued Feb. 24, 1976, to F. Imperiali discloses a self-actuated scram system utilizing pairs of electromagnets which act upon a single armature to suspend and release absorber material into the reactor core region.

U.S. Pat. No. 3,976,540 issued Aug. 24, 1976 to E. S. Sowa discloses an automatic safety rod which is held in position above the reactor core by a plurality of magnetic latching devices, each having a yoke which has a predetermined Curie point temperature. When the temperature is exceeded, the yoke is demagnetized, breaking the magnetic circuit supporting the control rod which then descends into the reactor core.

U.S. Pat. No. 4,304,632 issued Dec. 8, 1981 to S. K. Bhate et al discloses an electromagnet, an armature and control rods attached to the armature. The magnetic path includes a Curie point temperature material such that when the established temperature is exceeded, the magnetic path breaks causing the armature to drop the attached control rod.

In addition to the above-referenced patents, U.S. Pat. Application Ser. No. 270,682 filed June 4, 1981 in the name of D. M. Barrus et al, and assigned to the assignee of this application, describes and claims a thermionic switched, electromagnetic latched self-actuating reactor shutdown system. In this system an electromagnetically actuated latch mechanism retains the control rod in a ready or cocked position. Upon an increase in coolant temperature beyond a selected point, for example, a thermionic device, connected electrically to the electromagnetic latch mechanism, is heated so as to conduct current which effects a short circuit of the electromagnet causing same to lose holding power which releases the control rod to drop by gravitational force into the reactor core.

While these various approaches have been developed for reactor control, a need has existed and efforts are going forward to develop more efficient and simple self-actuated control systems which are failsafe, reliable, testable in the core at shutdown, resettable and capable of actuating upon sensing either the initiation of a transient coolant temperature increase event or a transient over-power (increased reactivity) event, as well as being capable of actuation by plant operators.

SUMMARY OF THE INVENTION

The present invention provides a simple, yet effective method of activating an electromagnetically controlled self-actuated control system, such as described and claimed in the above-referenced application.

Therefore, it is an object of this invention to provide an actuator for an electromagnetically controlled self-actuated control system for nuclear reactors.

A further object of the invention is to provide a temperature responsive activation arrangement for an electromagnetically controlled reactor control system.

Another object of the invention is to provide an electromagnetically activated reactor control system which utilizes a temperature responsive magnetic reed switch assembly.

Another object of the invention is to provide a magnetic reed switch assembly for use in electromagnetically controlled reactor shutdown systems.

Another object of the invention is to provide a magnetic reed switch which utilizes a Curie-point temperature material for activating the switch.

Another object of the invention is to provide a magnetic reed switch having a sleeve of Curie-point material surrounding the switch, which sleeve is constructed of thin strips to increase response to temperature increases.

Other objects of the invention will become readily apparent from the following description and accompanying drawings.

The above objects are carried out by providing a temperature responsive magnetic reed switch for controlling an electromagnetically actuated self-actuating shutdown system (SASS) for a nuclear reactor. The magnetic reed switch of this invention is responsive to reactor coolant temperature by utilizing a shunt of Curie-point material which normally diverts or short-circuits the magnetic field from the reed switch until its Curie-point temperature is reached or exceeded, whereupon the reed switch is activated, which in turn activates the electromagnet of the shutdown system. In one embodiment the Curie-point material is constructed as a sleeve positioned about the reed switch, the sleeve being made of thin strips in order to respond rapidly to sudden changes in reactor coolant temperature.

DETAILED DESCRIPTION OF THE INVENTION

Figure 1:
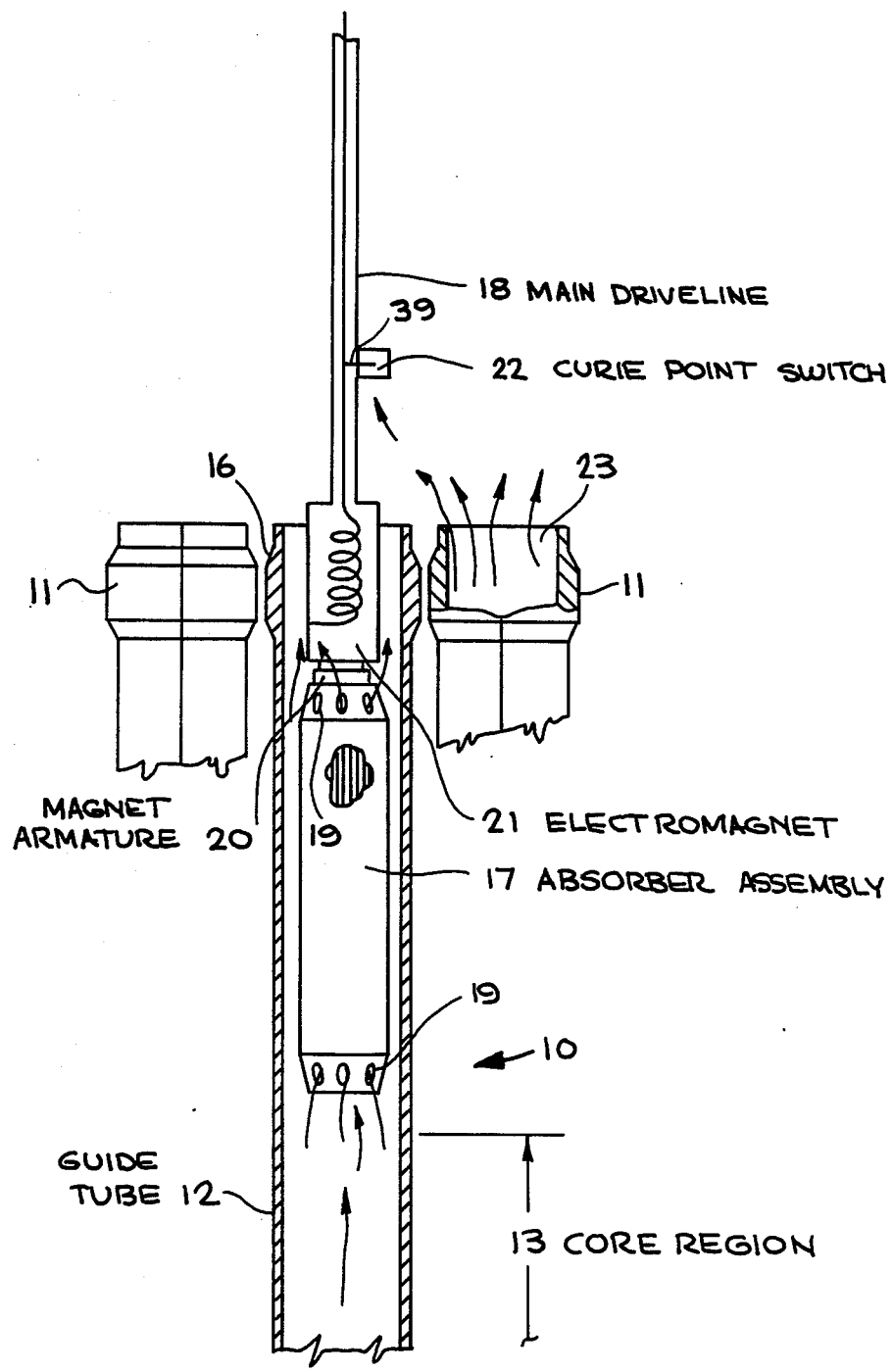
FIG. 1 illustrates an electromagnetically actuated reactor control rod system utilizing the invention for controlling the electromagnet.

The present invention is directed to a Curie-point actuated, magnetic reed switch assembly particularly adapted for an electromagnetically actuated self-actuated reactor shutdown system (SASS). While the invention is particularly applicable for use in a liquid metal fast breeder reactor (LMFBR), it can be utilized in other types of reactors. A SASS is defined as a control rod system that can scram the reactor automatically without either a signal from an external control circuit or an operator action. Initiation of the scram in accordance with the present invention is entirely from direct sensing of coolant temperature.

The SASS utilizing the Curie-point activated, magnetic reed switch of this invention employs an electromagnetic latch mechanism, similar to that in above-referenced U.S. application Ser. No. 270,682, to activate a control rod scram without a signal from the reactor operating control system. The use of electromagnetic latch mechanisms to retain absorber elements such that during normal operation the control rod is held above the reactor core and is dropped into the core upon release of the latch mechanism by gravitational force on the absorber element, are known in the art as pointed out above. While the present invention is particularly applicable to a control system which utilizes this known principal of operation, the invention involves a magnetic reed switch assembly which is responsive to high coolant temperature conditions of the reactor. The magnetic reed switch assembly functions to control an electromagnet which, in turn, releases the absorber element.

While the Curie-point activated magnetic reed switch assembly of this invention is described hereinafter in its application for activation of an electromagnetically activated reactor shutdown system, it is not intended to limit the invention to use in reactor control systems. The invention may find use in various applications wherein a temperature responsive switch is required.

As pointed out above, one approach for a SASS, as described and claimed in above-referenced U.S. application Ser. No. 270,682, utilizes an electromagnetic grapple to hold a control rod in position above the reactor core. In that approach, thermionic diode switches are used to sense an excessive core outlet temperature and short-circuit the electromagnet causing same to drop the control rod. The present invention provides an alternative to the thermionic diode switch approach and consists of a magnetic reed switch assembly which can be caused to close by a magnetic field. In normal operation the magnetic field of a permanent magnet is short-circuited by a magnetic shunt, diverting the magnetic field away from the reed switch. The magnetic shunt is made of a special alloy (such as nickel-iron) having a Curie-point at the desired release temperature. Above that temperature the material loses its ferromagnetic properties, and the magnetic path is directed through the reed switch which closes and short-circuits the control rod electromagnetic grapple.

Referring now to FIG. 1 a SASS incorporating the present invention is illustrated. As known in the art and illustrated in the drawings, the control rods or elements of the SASS are positioned within a reactor core array containing a plurality of fuel assemblies. The fuel regions of the fuel assemblies are located in the core of the reactor, while the control rod or neutron absorber element is maintained in a location exterior of the reactor core region under normal reactor operating conditions. The SASS or control assembly generally indicated at 10 is positioned within a reactor core array composed of a plurality of reactor fuel assemblies 11. The control assembly 10 is encased in guide tube 12 which extends through the reactor core region indicated at 13 and secured in the core at the lower end of the guide tube as known in the art. Guide tube 12 is provided at the lower end with a plurality of coolant inlet openings, not shown, through which reactor coolant under pressure is directed upwardly as indicated by the flow arrows. Movably located within the upper end 16 of guide tube 12 is an absorber assembly (control rod) 17, and a main driveline assembly 18, which are spaced from the inner surface of the guide tube so as to provide for coolant flow therebetween as indicated by flow arrows. Absorber assembly 17, containing neutron absorbing material as known in the art, is provided with a plurality of openings 19 in the lower and upper ends thereof to allow coolant to flow therethrough, as indicated by flow arrows. Secured to the upper end of absorber assembly 17 is a magnet armature 20 which cooperates with an electromagnet 21 secured to the main driveline 18 to retain the absorber assembly in its ready or cocked position exterior of core region 13 as shown, when electromagnet 21 is energized. Positioned in guide tube 12 below the core region 13 is a control assembly snubber or kinetic energy absorbing means (not shown) which retards the downward movement of the absorber assembly 17 after it passes into the core region.

As pointed out above, the direct holding of a reactor control (absorber) rod by an electromagnet secured to the end of a control drive similar to the apparatus of FIG. 1, as thus far described, is known. In operation of the apparatus thus far described, the electromagnet 21 is lowered by the driveline 18 to contact the magnet armature 20 on the top of the control rod or absorber assembly 17, and the electromagnet 21 is energized by application of electrical current from a power source, not shown, whereby the assembly 17 is attracted to the electromagnet and is withdrawn from the core region 13 by driveline 18 and positioned in its ready or cocked location above the core region as shown. Release (scram) of the absorber assembly 17 is obtained by reducing the holding power of the electromagnet 21. For example, such release may be obtained by a known method where the reactor undergoes a thermal transient and the coolant is heated above normal thereby heating an activator for the electromagnet to a calibrated Curie-point, causing the magnet to release the control rod.

The main driveline 18 is actuated by a mechanically driven system (not shown) supported on the reactor top shield. A variety of such mechanical drive systems are known, such as electrically driven racks and pinions, roller nut and ball nut screws. The driveline 18 is usually sealed by bellows that allow the linear movement to be translated through the reactor containment boundary.

Figure 2:
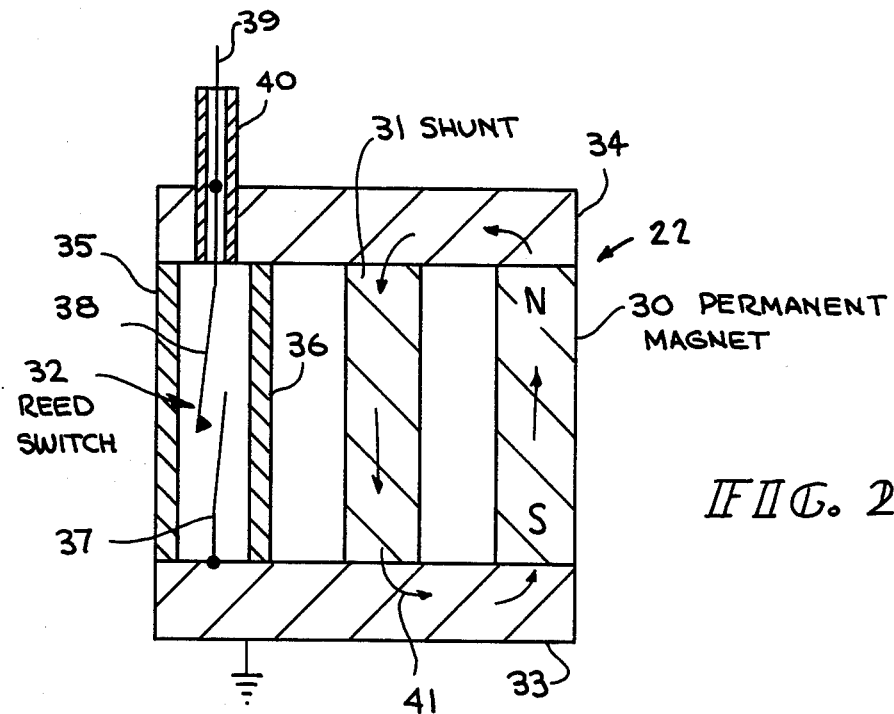
FIGS. 2 and 3 illustrate an embodiment of the temperature responsive magnetic reed switch assembly made in accordance with the invention, and its operation during normal and excessive temperatures.
Figure 4:
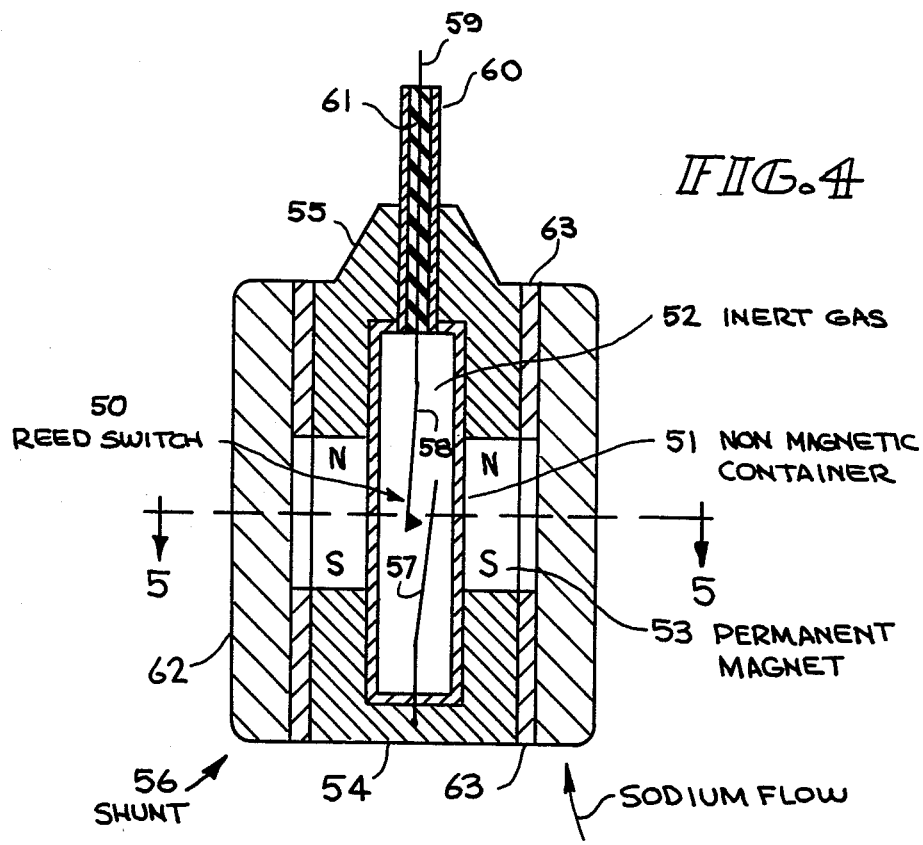
FIG. 4 illustrates another embodiment of the magnetic reed switch assembly.

Release of the absorber element 17 in accordance with the present invention provides a substantially higher speed of response and involves a Curie-point, magnetic reed switch such as illustrated in the embodiments of FIGS. 2 and 4. The reed switch device is attached electrically in parallel with the electromagnet and when the switch conducts it shorts the electromagnet current causing it to lose its holding power.

The Curie-point activated electromagnetic latch arrangement illustrated in FIG. 1 consists of a Curie-point, magnetic reed switch 22 located above and electrically connected in parallel, as described hereinafter, with the electromagnet 21, the switch 22 being temperature sensitive and mounted on main driveline 18 so as to be able to sense the temperature of the coolant flowing upwardly. The magnetic reed switch assembly 22 is located externally of main drive line 18 and located above coolant outlets 23 of the fuel assemblies 11 so that heated coolant indicated by the flow arrows passing through coolant outlets 23 is directed thereonto.

Figure 3:
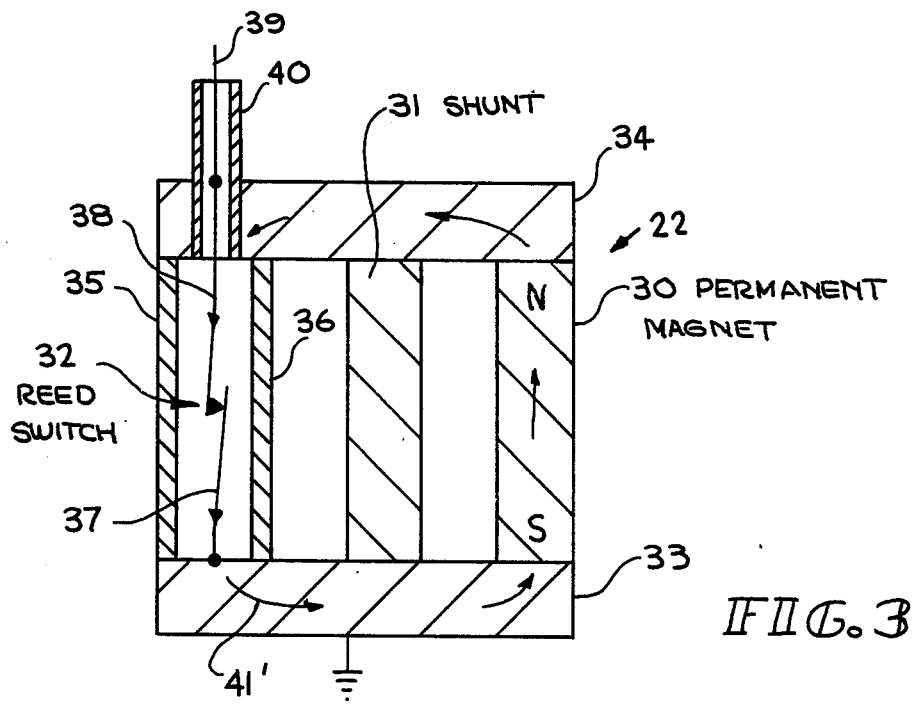

Referring now to the embodiment of the Curie-point, magnetic reed switch assembly illustrated in FIGS. 2 and 3, FIG. 2 illustrates the switch in open position during normal operating (below Curie-point) temperature, while FIG. 3 illustrates the switch in closed position during excessive (above Curie-point) temperature. The embodiment of the switch assembly basically consists of a permanent magnet 30, a magnetic shunt or strip of Curie-point material 31, such as a nickel-iron alloy, and a reed switch generally indicated at 32 positioned in spaced relation between magnetic soft iron end caps or end pieces 33 and 34. The reed switch 32 having a pair of reeds or contacts is enclosed or contained by a pair of nonmagnetic members 35 and 36, made of austenitic stainless steel, for example. One ferromagnetic reed or contact 37 of switch 32 is connected to magnetic end cap or pole piece 33, while the other ferromagnetic reed or contact 38 of the switch is connected to an electrical lead 39 which extends through a hollow member, tube or conduit 40 mounted in magnetic end cap or pole piece 34. The electrical lead 39 is operatively connected for activation (de-energization) of the electromagnet 21 of the FIG. 1 control system.

Magnetic reed switches and their operation are known in the art, as evidenced by U.S. Pat. No. 3,295,081 issued Dec. 27, 1966 to K. M. Bowyer et al, U.S. Pat. No. 3,812,441 issued May 21, 1974 to M. Sakamoto et al, and U.S. Pat. No 4,023,128 issued May 10, 1977 to T. Itou et al, and thus the basic principles of operation of such switches need not be described herein.

Referring again to FIGS. 2 and 3, under normal (below Curie-point) operating temperature of the reactor coolant, the path of the magnetic field of permanent magnet 30 is short circuited through the magnetic shunt 31, diverting the magnetic field away from the reed switch 32, as indicated at 41.

The magnetic shunt 31 is designed and constructed of selected material to have a Curie-point at the desired release temperature for activating (de-energizing) electromagnet 21 and releasing absorber assembly 17 into core region 13 of FIG. 1. Above that release temperature the material of shunt 31 loses its ferromagnetic properties, as seen in FIG. 3, and the magnetic path indicated at 41' is diverted through the reed switch 32 which closes reeds or contracts 37 and 38 and short-circuits the control rod electromagnetic grapple, causing it to lose its holding power and drop the control rod.

By way of example, the nickel-iron alloy of which magnetic shunt 31 is constructed may consist of nickel in the range of 50 to 65% and iron in the range of 50 to 35% having a Curie-point temperature range of 500° to 610° C. In addition, other alloys such as silicon-iron or aluminum-iron may be used to produce this same temperature range.

Figure 5:
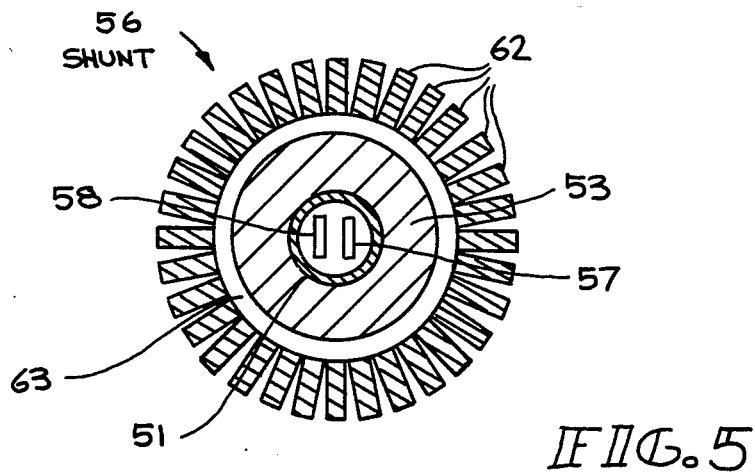
FIG. 5 is a view taken along lines 5—5 of the FIG. 4 embodiment.

FIGS. 4 and 5 illustrate an embodiment of the Curie-point, magnetic reed switch assembly specifically adapted for use in sensing sodium coolant temperature at the outlet of a liquid metal fast breeder reactor core, and may be positioned in the FIG. 1 control system at the coolant outlet 25 of a fuel element 11 or within the guide tube 12, above absorber assembly 17, and electrically connected to electromagnet 21 for activation (de-energization) thereof to release the absorber assembly 17.

As shown in the FIGS. 4-5 embodiment, the reed switch assembly consists basically of a reed switch generally indicated at 50 and enclosed in a nonmagnetic enclosure or container 51, constructed of austenitic stainless steel or other nonmagnetic alloy, containing an inert gas 52, such as argon or neon, and is surrounded by a tube-shaped permanent magnet 53 having magnetic soft iron end or pole pieces 54 and 55 provided with tubular shaped portions positioned at each end of magnet 53, and with an outer sleeve or shunt generally indicated at 56 of suitable Curie-point material, slidably positioned around the magnet 53 and end pieces 54 & 55. The reed switch 50 is provided with a pair of ferromagnetic reeds or contacts 57 and 58, reed 57 extending through nonmagnetic container 51 and making electrical contact with magnetic end piece 54, while reed 58 extends through nonmagnetic container 51 and is connected to a connector wire or lead 59 for electrical connection to the electromagnet 21 of the FIG. 1 apparatus. Lead 59 extends through a hollow member or tube 60 constructed of stainless steel or inconel mounted in magnetic end piece 55, tube 60 being filled with insulation material 61, such as magnesium oxide.

The Curie-point shunt or outer sleeve 56 (see FIG. 5) consists of a plurality of thin strips 62 secured to a pair of spaced tubular support members 63, all constructed of a selected alloy, such as described above, to have a Curie-point at the desired control rod release temperature. Note that support members 63 are located below and above the permanent magnet 53. The thin strips 62 of outer sleeve 56 function to respond rapidly to sudden changes in the sodium coolant temperature flowing thereby.

In operation of the FIGS. 4-5 embodiment, the magnetic field flow path during normal (below Curie-point) operating temperature of the reactor sodium coolant, flowing upwardly past the reed switch assembly as indicated by legend, is from the north pole (N), of magnet 53 through end piece 55, outer sleeve or shunt 56, end piece 54 to the south pole (S) of magnet 53, thus diverting the magnetic field away from the reed switch 50. Upon the operating temperature of the upwardly flowing coolant reaching the Curie-point of the material of outer sleeve 56, the material loses its ferromagnetic properties, and the magnetic path is diverted through the reed switch 50 which closes the reeds or contracts 57 and 58, causing shortcircuiting of the electromagnet 21, as described, and dropping of the absorber assembly 17.

The reed switch assembly of the FIG. 4 embodiment can be tested by removing the Curie-point outer sleeve 56 from about the magnet 53 which causes the reed switch 52 to close if operating properly.

It has thus been shown that the invention fills the above-mentioned need and provides a simple yet effective approach to activating an electromagnetic grapple for a reactor control system. This approach involves a Curie-point, magnet reed switch assembly which can be caused to be rapidly closed by a magnetic field, and is responsive to sudden increases in reactor coolant temperature. Thus, the invention advances the state of the art by providing an alternative to the thermionic switch arrangement currently utilized in control rod electromagnetic grapple mechanisms. The magnetic reed switch of this invention can be incorporated into such mechanism by direct replacement, thus eliminating any redesign efforts of the grapple mechanism.

While particular embodiments of the invention have been illustrated and described, modifications will become apparent to those skilled in the art, and it is intended to cover in the appended claims all such modifications as come within the scope of this invention.

I claim:

1. A temperature responsive magnetic reed switch assembly comprising:
   a permanent magnet,
   magnetic pole pieces located at and in contact with opposite ends of said permanent magnet,
   a magnetic shunt constructed of Curie-point material positioned adjacent said permanent magnet and in contact with said pole pieces, and
   a reed switch positioned between said pole pieces and provided with a pair of ferromagnetic reeds, a nonmagnetic enclosure around said reeds, a first of said reeds being secured at one end thereof to one of said pole pieces, a second of said reeds having one end thereof extending into and secured to a hollow member positioned in and extending through another of said pole pieces, said one end of said second of said reeds being secured to a connector adapted to be connected to a point of use;
   whereby under temperature conditions less than the Curie-point of said magnetic shunt material, a magnetic path is directed through said shunt and short circuits said reed switch, and upon the temperature conditions reaching at least the Curie-point of said shunt material, the material becomes nonmagnetic such that the magnetic path is directed through said reed switch causing activation thereof.

2. The magnetic reed switch assembly of claim 1 additionally inlcuding an inert gas contained within said enclosure.

3. The magnetic reed switch assembly of claim 1, wherien said permanent magnet, said magnetic shunt, and said reed switch are positioned in a spaced, side by side relationship.

4. The magnetic reed switch assembly of claim 3, wherein said magnetic shunt is located intermediate said permanent magnet and said reed switch.

5. The magnetic reed switch assembly of claim 1 wherein said permanent magnet is of a tubular configuration, wherein said reed switch is located at least partially within said permanent magnet, and wherein said magnetic shunt is positioned around said permanent magnet.

6. The magnetic reed switch assembly of claim 5 additionally including an inert gas contained in said enclosure.

7. The magnetic reed switch assembly of claim 5 wherein said hollow member contains insulation material.

8. The magnetic reed switch assembly of claim 5 wherein each of said magnetic pole pieces includes a tubular shaped section extending around a portion of said reed switch.

9. The magnetic reed switch assembly of claim 5 wherein said magnetic shunt is in the form of a sleeve slidably positioned about said permanent magnet.

10. The magnetic reed switch assembly of claim 5 wherein magnetic shunt is configured as a sleeve having a plurality of thin strips of Curie-point material secured in spaced relation about a plurality of spaced tubular support members of Curie-point material.

11. In a control rod system for a nuclear reactor utilizing an electromagnetic grapple mechanism for holding and releasing a control rod, the improvement comprising a magnetic reed switch assembly having a Curie-point magnetic shunt and responsive to reactor coolant temperature for short circuiting the electromagnetic grapple mechaninsm causing release of the control rod when the coolant temperature reaches the Curie-point of said magnetic shunt, said magnetic reed switch assembly including:
   a permanent magnet,
   a pair of magnetic pole pieces located at and in contact with opposite ends of said permanent magnet,
   said Curie-point magnetic shunt being positioned adjacent said permanent magnet and in contact with said pair of magnetic pole pieces, and
   a reed switch positioned intermediate said pole pieces and provided with a pair of ferromagnetic reeds, a nonmagnetic enclosure around said reeds, a first of said reeds being secured at one end to a first of said pair of pole pieces, a second of said reeds having one end extending into and secured to a hollow member positioned in and extending through a second of said pair of pole pieces, said one end of said second of said reeds secured to a condector adapted to be connected to the electromagnetic grapple mechanism.

12. The improvement of claim 11 wherein said permanent magnet, said magnetic shunt, and said reed switch are positioned in a spaced side-by-side relation.

13. The improvement of claim 12 wherein said magnetic shunt is located between said permanent magnet and said reed switch.

14. The improvement of claim 11 wherein said permanent magnet has a tubular configuration, wherein each of said pole pieces includes a tubular section, wherein said reed switch is located within said permanent magnet and said tubular sections of said pole pieces, and wherein said magnetic shunt has a tubular configuration and is located about said permanent magnet and about at least portions of said pole pieces.

15. The improvement of claim 14 wherein said magnetic shunt comprises a plurality of spaced tubular shaped members of Curie-point material members and a plurality of strips of Curie-point material secured in spaced relation about an outer surface of said tubular shaped members.

16. The improvement of claim 11 wherein said Curie-point magnetic shunt is constructed of material selected from the group consisting of nickel-iron, silicon-iron, and aluminum-iron and becomes nonmagnetic at a temperature in the range of about 500° C. to about 610° C.

* * * * *